United States Patent
Cooper et al.

(10) Patent No.: US 11,455,344 B2
(45) Date of Patent: Sep. 27, 2022

(54) COMPUTER IMPLEMENTED SYSTEM AND METHOD FOR GEOGRAPHIC SUBJECT EXTRACTION FOR SHORT TEXT

(71) Applicant: Fivecast Pty Ltd, Kent Town (AU)

(72) Inventors: Brenton Cooper, Kent Town (AU); Nicholas Lothian, Kent Town (AU); Grant Neale, Kent Town (AU); Terry Moschou, Kent Town (AU); Grant Osborne, Kent Town (AU)

(73) Assignee: Fivecast Pty Ltd, Kent Town (AU)

( * ) Notice: Subject to any disclaimer, the term of this patent is extended or adjusted under 35 U.S.C. 154(b) by 129 days.

(21) Appl. No.: 17/253,691

(22) PCT Filed: Jun. 20, 2019

(86) PCT No.: PCT/AU2019/000076
§ 371 (c)(1),
(2) Date: Dec. 18, 2020

(87) PCT Pub. No.: WO2019/241822
PCT Pub. Date: Dec. 26, 2019

(65) Prior Publication Data
US 2021/0263972 A1    Aug. 26, 2021

(30) Foreign Application Priority Data
Jun. 20, 2018   (AU) .............................. 2018902208

(51) Int. Cl.
*G06F 16/00*   (2019.01)
*G06F 16/909*  (2019.01)
(Continued)

(52) U.S. Cl.
CPC .......... *G06F 16/909* (2019.01); *G06F 16/908* (2019.01); *G06F 16/93* (2019.01); *G06F 40/295* (2020.01); *G06V 30/274* (2022.01)

(58) Field of Classification Search
CPC ...... G06F 16/909; G06F 16/908; G06F 16/93; G06F 40/295; G06F 16/29; G06V 30/274; G06Q 50/01
See application file for complete search history.

(56) References Cited

U.S. PATENT DOCUMENTS 8,676,807 B2   3/2014 Xiao et al.
9,747,278 B2   8/2017 Bier et al.
(Continued)

FOREIGN PATENT DOCUMENTS

EP          2631814 A3 *  1/2015  ............. G06F 16/29
WO     WO 2015/165522       11/2015

OTHER PUBLICATIONS

Aflaki et al., Challenges in creating an annotated set of geospatial natural language descriptions (Year: 2018).*
(Continued)

*Primary Examiner* — Syed H Hasan
(74) *Attorney, Agent, or Firm* — McDonnell Boehnen Hulbert & Berghoff LLP (57) ABSTRACT

A computer implemented method for estimating a geographic location (geotag) from one or more short texts is described. Geo-tagging a short text post involves first determining location candidates from parsing text and then determining location resolutions (eg city, state) for each location candidate. Typically there are multiple resolutions for each candidate and then location resolution disambiguation is performed to identify the correct resolution from the set of potential resolutions This may be achieved by using context provided by other candidates within the post, as well as additional geographic context derived from the post author and their network. In particular, anchor locations may be obtained from metadata associated with the post to assist in resolution disambiguation.

22 Claims, 2 Drawing Sheets

(51) Int. Cl.
  *G06F 16/93* (2019.01)
  *G06F 16/908* (2019.01)
  *G06F 40/295* (2020.01)
  *G06V 30/262* (2022.01)

(56) References Cited

U.S. PATENT DOCUMENTS

| | | | |
|---|---|---|---|
| 2010/0179754 A1* | 7/2010 | Faenger | G06F 16/9537 701/532 |
| 2012/0117007 A1* | 5/2012 | Agrawal | G06F 16/29 707/711 |
| 2014/0236882 A1 | 8/2014 | Rishe | |
| 2015/0220625 A1 | 8/2015 | Cartmell et al. | |
| 2016/0085767 A1* | 3/2016 | Samet | G06F 16/29 707/722 |
| 2017/0262412 A1* | 9/2017 | Liang | G06F 40/10 |
| 2019/0012374 A1* | 1/2019 | Petroni | G06F 16/90332 |
| 2019/0251122 A1* | 8/2019 | Rivas | G06F 16/24578 |

OTHER PUBLICATIONS

Adams et al., On the Geo-Indicativeness of Non-Georeferenced Text (Year: 2012).*

Wing et al., Simple Supervised Document Geolocation with Geodesic Grids (Year: 2011).*

Lieberman, M., You are where you edit: Locating Wikipedia contributors through edit histories (Year: 2009).*

Amitay et al., Web-a-Where: Geotagging Web Content (Year: 2004).*

Zhiyuan Cheng et al., "You Are Where You Tweet: A Content-Based Approach to Geo-locating Twitter Users," CIKM' 10, Oct. 26-30, 2010, 10 pages.

Shawn Brunsting, et al., "GeoTextTagger: High-Precision Location Tagging of Textual Documents using a Natural Language Processing Approach," arXiv:1 601.05893v1 [cs.AI] Jan. 22, 2016, 35 pages.

David Jurgens, "That's What Friends are For: Inferring Location in Online Social Media Platforms Based on Social Relationships," Proceedings of the Seventh International AAAI Conference on Weblogs and Social Media, 2013, 273-282.

Shervin Malmasi and Mark Dras, "Location Mention Detection in Tweets and Microblogs," 2015 Pacific Association for Computational Linguistics, May 2015, 7 pages.

Benjamin Patai Wing, "Text-based document geolocation and its application to the digital humanities," Wing-Disseratation-2015, https://repositories.lib.utexas.edu/handle/2152/40313, Dec. 2015, 2 pages.

International Preliminary Report on Patentability from International Application No. PCT/AU2019/000076, dated Aug. 11, 2020, 4 pages.

International Search Report from International Application No. PCT/AU2019/000076, dated Aug. 26, 2019, 4 pages.

Written Opinion from International Application No. PCT/AU2019/000076, dated Aug. 26, 2019, 4 pages.

* cited by examiner

COMPUTER IMPLEMENTED SYSTEM AND METHOD FOR GEOGRAPHIC SUBJECT EXTRACTION FOR SHORT TEXT

The present application is the US national phase under 35 U.S.C. § 371 of International Application No. PCT/AU2019/000076, filed Jun. 20, 2019, which claims priority from Australian Provisional Patent Application No. 2018902208 titled "COMPUTER IMPLEMENTED SYSTEM AND METHOD FOR GEOGRAPHIC SUBJECT EXTRACTION FOR SHORT TEXT" and filed on 20 Jun. 2018, the contents of which are hereby incorporated by reference in their entirety.

PRIORITY DOCUMENTS

The present application claims priority from Australian Provisional Patent Application No. 2018902208 titled "COMPUTER IMPLEMENTED SYSTEM AND METHOD FOR GEOGRAPHIC SUBJECT EXTRACTION FOR SHORT TEXT" and filed on 20 Jun. 2018, the content of which is hereby incorporated by reference in its entirety.

TECHNICAL FIELD

The present disclosure relates to data mining methods for large databases of short texts posted online. In a particular form the present disclosure relates to estimating geographic locations referred to in short texts.

BACKGROUND

Understanding location information associated with social-media posts is key to many applications such as searching and event forecasting/prediction. However on most social media platforms, less than 2-3% of posts are actually annotated with location metadata. Further this location metadata only identifies a user's current location or their base location. In many cases the geographic location the user is discussing, rather than where they currently are (or normally are). For example a user from Sydney may be intending to visit the Melbourne Cricket Ground and post "Looking forward to going to the Melbourne Cricket Ground this weekend". In this case the location the user is referring to is the Melbourne Cricket Ground in Melbourne, whilst their current location is Sydney (some 900 km away).

Given the low rate of texts being annotated with accurate location metadata, various geotagging or geolocation systems have been developed. Many of these have focussed on the use of machine learning based classification systems, but have generally performed poorly on short texts such as Twitter tweets. Another approach to geotagging has been to use natural language processing algorithms such as a part of speech (POS) tagger together with a named entity recognition (NER) which attempts to identify named entities and classify them as a person, location or organisation. Candidate locations are provided to the OpenStreetMap via Nominatim tool (https://nominatim.openstreetmap.org/) which returns multiple possible global geographic locations for an input query (10 by default). These results then need to be resolved (or disambiguated) to the most likely location. In this system a distance based metric is used to disambiguate multiple locations for example by identifying the two closest locations. For example in a text such as "Waterloo is not far from London", London resolves to the UK and Ontario (at the city/state/country level), and Waterloo resolves to Ontario and Belgium (at the city/state/country level), and of the four possible combinations, London Ontario and Waterloo Ontario are the closest (79 km) by hundreds of kilometres and so are returned as the most likely candidate locations.

However one problem is that this relies on the text containing at least two locations. Whilst this is often suitable for use on large text documents such as Wikipedia pages but is more limited for use on short texts such as Twitter tweets which often only contain a reference to one location. There is thus a need to provide a method for estimating a geographic location referred to in a short text, or at least to provide a useful alternative to existing systems.

SUMMARY

According to a first aspect, there is provided a computer implemented method for estimating a geographic location from one or more documents posted online, the method comprising:

obtaining one or more documents posted online, and metadata relating to each posted document;

determining one or more location candidates from parsing text in each document and metadata, wherein each location candidate is a geographic location referred to, or included in the text;

determining one or more location resolutions for each location candidate, wherein each location resolution comprise geographic location metadata comprising at least a country; and determining one or more anchor location from analysing the metadata;

performing resolution disambiguation on the one or more location resolutions for each location candidate using the identified anchor location to obtain an estimate of the most likely geographic location for the location candidate; and reporting the most likely geographic location for each location candidate.

In one form, the metadata relating to a posted document comprises an author who posted the document and the one or more anchor location may be selected from one or more of:

a tagged location mention;

a geotag comprising geographic coordinates of the author at the time of posting;

an author profile location; and/or a geographic location of the most populous city in the same time zone as the author time zone.

In a further form, the posted document is a "share" or "reply" post to an original post and the one or more anchor location is selected from one or more of the following from the original post:

a tagged location mention;

a geotag comprising geographic coordinates of the author at the time of posting;

an author profile location; or a geographic location of their most populous city in the same time zone as the author time zone.

In one form, the one or more anchor location may be selected using a label propagation algorithm applied to friends, followers, and "@mentions" associated with the author who posted the document.

In one form, the one or more anchor location may be selected using conversation based features comprising the set of texts sharing a common reference.

In one form, the one or more anchor location may be selected using the posting history of the author who posted the document. In a further form, the one or more anchor location may be selected by analysing the posting history of the author within a predetermined time period.

In one form, the one or more anchor location may comprise determining the language of the author who posted the document and selecting the geographic locations of a capital city in a country associated with the determined language.

In one form, the text may be passed through a one or more Bloom filters, each constructed from a database of location level names to identify one or more location candidates.

In one form, one or more location candidates may be selected using conversation based features comprising the set of texts sharing a common reference.

In one form, the step of determining one or more location candidates may comprise passing the text through a word segmenter and a natural language processing based named entity recognition filter to produce a plurality of N-gram location candidates, and the N-gram location candidates are each passed to one or more Bloom filters each constructed from a database of location names, and a Regular Expression Filter configured to identify points of interest (POIs), street addresses and relative location mentions.

In a further form the method further may comprise a location override filter configured to provide specific user-configured location resolutions for a small set of candidates, and one or more location candidates from the bloom filter and Regular Expression Filter are filtered to exclude location candidates identified by the location override filter.

In one form, resolution disambiguation may be performed using a distance based scoring function such that the most likely geographic location for a location candidate has a score corresponding to the shortest total distance between possible pairs of location resolutions. In a further form, resolution disambiguation may comprise computing the a geographic distance measure between each location resolution and all potential location resolutions for other candidate locations and assigning a score for each location resolution based on a distance to the closest resolution for each other candidate location, and then selecting the location resolution with the highest score from all non-anchor candidates, excluding candidates having only a single resolution, and then eliminating other location resolutions for the corresponding candidate location, and repeating until a single location resolution remains for every location candidate.

In a further form, the scoring function may use a weighting function. In a further form, the anchor location may be estimated from analysing the posting history of the user, and a time decay is applied to the posting history, and the disambiguation resolution uses the time decay as a weight function.

In one form resolution disambiguation may be performed by minimising a weighted distance between all extracted candidate locations. In one form a greedy algorithm may be used to select an anchor term $t^*$ and a location result $r^*$ that have the highest score $(S_{r,*}{}^{t^*})$ using a scoring function, wherein the scoring functions is selected from the group consisting of scoring function based on a total distance, an inverse distance, an inverse term frequency, or weighted versions or weighted normalised versions of the preceding. In one form the greedy algorithm may use a single loop to disambiguate the terms.

In a further aspect, a computer program product comprising computer readable instructions for causing a processor to perform embodiments of the method may be provided. In a further aspect a computing system comprising at least one processor operatively coupled to at least one memory, wherein the processor is configured to perform embodiments of the method may be provided.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
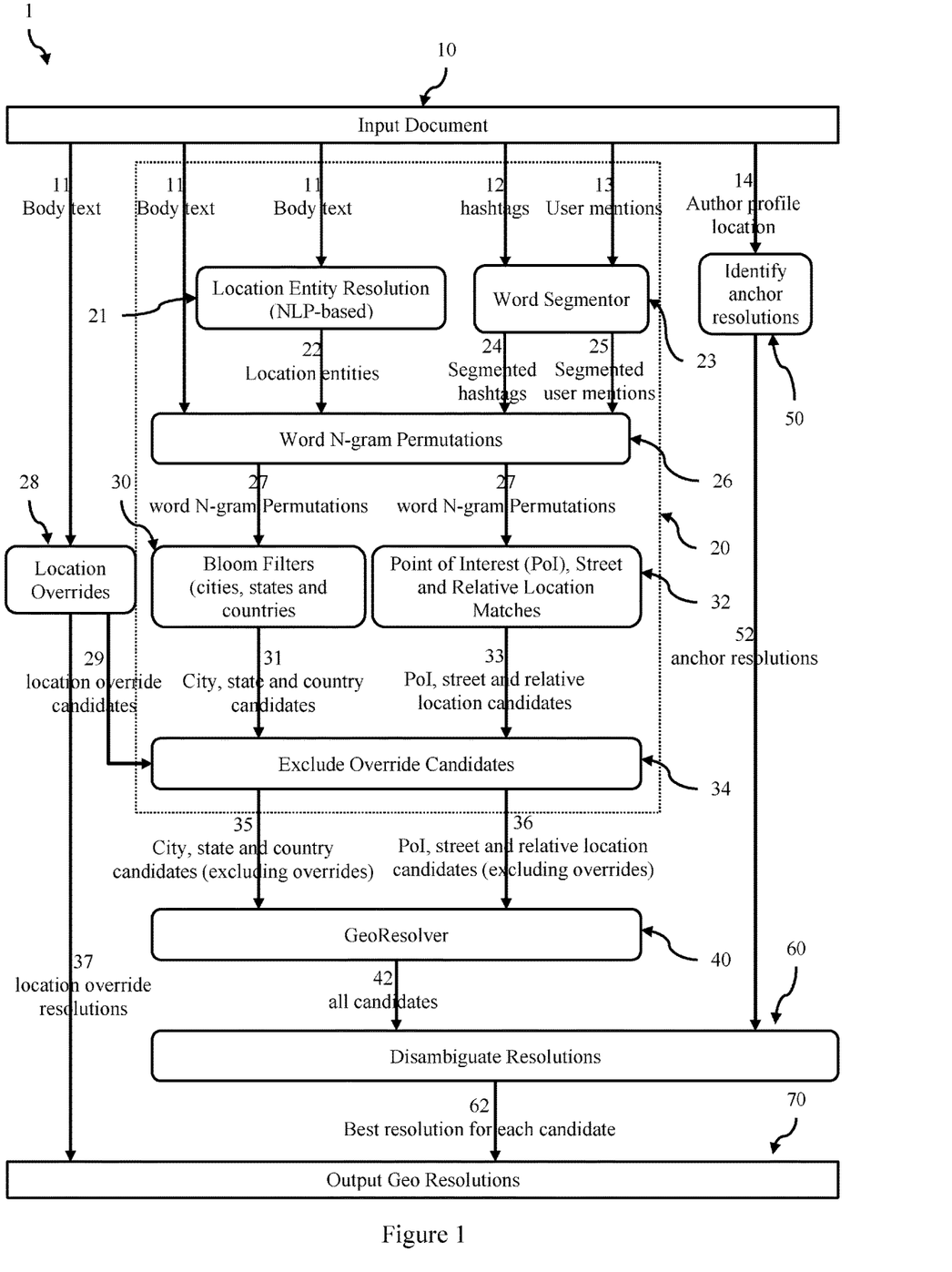
FIG. 1 is a schematic diagram of data and modules for implementing a method for estimating a geographic location from one or more short texts according to an embodiment.
Figure 2:
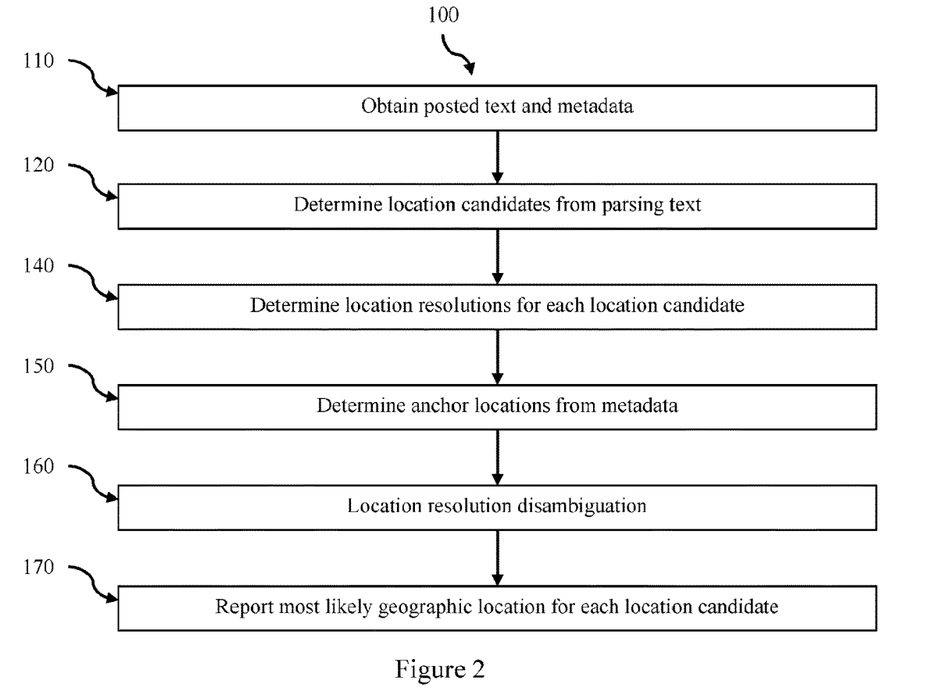
FIG. 2 is a flowchart of a method for estimating a geographic location from one or more short texts according to an embodiment.
Figure 3:
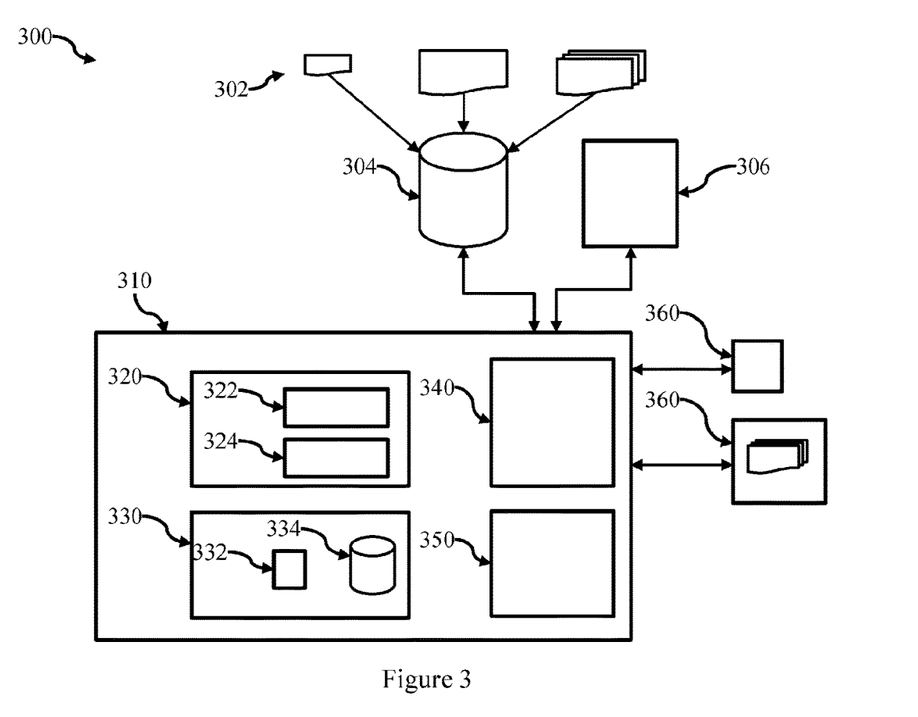
FIG. 3 is a schematic diagram of system for implementing a method for estimating a geographic location from one or more short texts.

Referring now to FIGS. 1, 2, and 3 there is shown a data flow diagram 1, a flowchart 100, and a system 300 for implementing a method for estimating a geographic location (geo-tagging) from one or more documents posted online according to an embodiment. The method is particularly suitable for geo-tagging short text messages such as twitter posts (tweets) and similar text messages with one or more geo-tags that indicate a geographic location that the message is referring to (as distinct from where the sender is located). Geo-tagging a short text post involves three substantive steps: candidate extraction 120, resolution of candidate locations for each location candidate 140, and location resolution disambiguation 160.

The method begins with a preliminary step 110 of obtaining a document posted online (a post), and metadata relating to the posted document 10. In this context a document is any online or electronic document containing text or content from which text can be extracted. This includes a tweet, a text message, tweet, post, blog, email, an image or MMS containing text which can be extracted using an OCR engine, or an audio or video post processed with a speech to text converter and/or OCR engine. In this context "posted online" is to be interpreted broadly and refers to a document sent by a first user to one or more other users, to a social media platform or to a communication network. In the context of this specification the first user will be referred to as or considered as the author of the posted document. The document may be either a public or private posting—that is it may be available for to anyone to read once posted, or it may be posted/sent to one or more selected users, or users limited to a group, chat room, or online community. For the sake of convenience we will refer to documents posted online as "posts" or messages.

A location candidate is segment of the post that refers to a geographic location. As an illustrative example, consider the following post with 3 location candidates highlighted in bold:

"Enjoying the Melbourne sun in Federation Square. Time for some food, then on to the Melbourne Cricket Ground."

A location resolution associates a location candidate with geographic location metadata such as city, state, country, and/or latitude and longitude. A key challenge arises from the fact that most candidates generate multiple potential resolutions in practice, as illustrated in Table 1. In the example, landmarks mentioned in the post make it clear that the correct resolution for all three candidates is "Melbourne, Victoria, Australia". The "Melbourne" candidate in this post is clearly not referring to "Melbourne, Fla., USA".

TABLE 1

Top 3 potential resolutions for each candidate in the example post, with the correct resolutions highlighted in bold.

| Candidate | Resolution City | Resolution State/County | Resolution Country |
|---|---|---|---|
| Melbourne | Melbourne | VIC | Australia |
|  | Melbourne | FL | USA |
|  | Melbourne | CA | USA |
| Federation Square | Melbourne | VIC | Australia |
|  | Murton | Durham | UK |
|  | Canberra | ACT | Australia |
| Melbourne Cricket Ground | Melbourne | VIC | Australia |

Location resolution disambiguation 160 identifies or estimates the correct (or best) resolution from the set of potential resolutions for each location candidate. In one embodiment this is achieved by using context provided by other candidates within the post, as well as additional geographic context derived from the post author and their network. In the above example Melbourne and Federation Square each identify multiple possible resolutions, whilst the "Melbourne Cricket Ground" candidate is specific enough that the geocoder returns only a single resolution. In particular, and as discussed below embodiments of the method further comprise determining anchor locations from metadata associated with the post to assist in resolution disambiguation.

The candidate extraction step 120 broadly comprises determining one or more location candidates from parsing text in the document and metadata, where each location candidate is a geographic location referred to, or included in the text (for example a word or sequence of words). These will also be referred to as terms. Location candidates can be extracted from multiple sources within a short text post. These sources include the post body text 11 and any other available fields or metadata associated with the post that may refer to locations. For example sources for Twitter posts include body text 11, hashtags 12, user-mentions 13 and tagged locations. In the case of images, audio or video messages, these documents may be passed through text extraction programs implementing techniques such as optical character recognition, symbol recognition, and speech-to-text converters. The extracted text sources are pre-processed to generate word N-gram permutations 26 which are then passed through one or more filters which identify location candidates. We can define the term set T of N terms (candidate locations) as $T=\{t_1, t_2, \ldots, t_N\}$ where for each term there may be multiple possible locations and we are seeking to determine (or estimate) the most likely location for the term (a process we refer to as disambiguation). As mentioned above, each term is a word (Sydney) or sequence of words ("Martin Place"). Each term also corresponds to a phrase where every phrase is only recorded once for the text. We can define the set of unique phrases for the text as the set P and note that word sequences that occur multiple times in the text only occur once in P. We further define a result r as a single geographical location that is listed in a knowledge base (eg GeoResolver). For each phrase $p \in P$ we seek a set of results $R^p$ from the GeoResolver knowledge base (eg Nominatim). For any term $t \in T$ we let $t_{phr}$ be the phrase in P associated with the term t. As shorthand we will use $R^t$ instead of $R^{tphr}$. In some embodiments, when terms occur multiple times in a text we will assume that they each refer to the same locations (although in other embodiments this could be relaxed). However it is noted that terms with phases such as "Martin Place, Sydney", and "Martin Place, Brisbane" will not be assumed to be the same location as they have different phrases. Disambiguation attempts to determine (obtain or estimate) a single most likely location for each phrase $p \in P$ using an approach that employs distance based scoring functions.

Pre-processing may comprise identifying the relevant language of the text, and stripping out reserved or source specific symbols such as "#" and "@". Text sources like Twitter hashtags 12 (e.g. #northadelaide) and user-mentions 13 (e.g. @nameoftwitteruser) are typically encoded without spaces between words. Such sources are pre-processed by passing through a word segmenter to produce N-gram segmented hashtags 24 and segmented users mentions 25 before being passed to the filters. For example, the word segmenter 23 would split "#northadelaide" into the 2-gram phrase "north adelaide".

In one embodiment, a location entity resolution module 21 implements a Named Entity Recognition (NER) Filter. Each source is processed by a Named Entity Recognizer (NER) model which labels sequences of words in a text which are recognised as the names of entities (including locations), and location entities 22 are returned as N-grams. This can be implemented using any suitable Natural Language Processing (NLP) toolkit, such as those based on the Stanford CoreNLP suite, including the Stanford Named Entity Recognizer module, OpenNLP, or SpaCy, each of which can be configured to tokenise and parse each text. As locations tend to be expressed as nouns, a noun phrase extractor is used to identify strings comprising nouns. Both simple and complex noun phrases can be generated. Further, as many short text contain poor grammar, misspelled words, abbreviations, slang, colloquial terms, and contain symbols such as "#" and "@", the parser can be configured to tag/identify unrecognised words (misspelled words, abbreviations, slang, colloquial terms), or phrases with which do not follow standard grammar conventions (poor grammar or hyperlinks). Noun phrases can be represented as an N-gram (an ordered set of N words). Sequences of words labelled as location entities 22 are returned by the NER filter. However as location references can be complex, and contain multiple locations, eg "Melbourne's Federation Square", the Word N-gram Permutation module 22 breaks an N gram into smaller combinations—for example a 3 gram into 1 and 2-grams phrases. These word N-gram permutations can then each be passed to further filters to identify location candidates One or more Bloom Filters 30 are constructed from a database of location names which is used to process every word N-gram 26, and each N-gram matching the bloom filter is returned as a location candidate. The bloom filter and location name databases (or similar document sources) it is built upon may be street level names, suburb level names, city level names, state/province level names, or country level names. In some embodiments the bloom filter location name database may be a hybrid of adjacent location levels, such as a combined suburb and city level names database. These location names may be compiled into a database or similar data structure from multiple sources. In some embodiments multiple bloom filters may be used, such as city Bloom filter, a state/province Bloom filter, and a country Bloom filter. In a high-volume distributed data processing system, looking up every single word against every single potentially matching location name imposes a very large performance penalty. A Bloom filter allows the list of potential matches to be compressed into a very small representation which can be quickly checked for matches, and thus provides a technical advantage (eg scalability) in big data applications.

The word N-grams permutations 27 can also be provided a Regular Expression (Regex) filter 32. In this filter every word N-gram from the source is matched against a set of regular expressions designed to capture each of the following categories:

Points of Interest (PoI; i.e. mountains, rivers, universities, sporting venues, etc.);
Street addresses; and
Relative location mentions (e.g. "3 km North of Clare").

Each regex filter can be configured to have two modes. In strict mode, only title-case matches are allowed. In non-strict mode case-insensitive matching is allowed. The longest match from each category is returned as a location candidate 33.

A further filter is the location override filter 28. This filter provides specific user-configured location resolutions for a small set of candidates that will be returned regardless of their context. This allows the user to prioritise recall over precision and false positive rate for specific high-importance candidates. In this filter source text is matched case-insensitively against the configured override candidates. An override candidate extractor 32 is used to exclude matched override candidates 29 from the Bloom 30, NER 27 and Regex Filter outputs. Matched override candidates 37 are provided as output geographic location resolutions 70.

The candidate extraction pipeline can be configured to achieve the performance characteristics required for a given application. Specifically:

Each of the Bloom 30, NER 21, Regex 32, and Override 28 Filters can be configured to operate on a chosen subset of the available candidate sources or disabled completely;
The NER Filter 21 can be configured to use a range of different NER models;
The Regex 32 Filter can be configured with use regular expressions and either strict or non-strict matching; and
The Override Filter 28 provides the option of configuring hard-coded resolutions for candidates designated high-importance by the user.

The above steps can be varied and extended. For example candidate extraction 120 can be performed from conversations (ie from multiple documents). For ease of understanding the above description focuses on extracting candidates from a single post on a social media service. However, many social networks allow topic-based "conversations" e.g. hashtags in twitter. The set of location candidates mentioned within the conversation can be used to label another tweet from that conversation. E.g. a tweet "Legal stoush erupts before coroner hands down #LindtCafe siege findings"—has no explicit geo-candidates within it, but a location could be inferred from analysis of the set of tweets with the #LindtCafe hashtag—these would include Sydney and NSW. That is, this is allows for location candidates to be extracted from conversations that are linked via a hashtag for example. So the specific text analysed might not have a location mention, but there are a number of location mentions in the conversation stream.

A further extension is that candidates from the "conversation" could be time-filtered, so that only a small subset of recent posts in that conversation are utilised. A further extension is to identify which "conversations" are linked to a small set of location candidates (e.g. the #LindtCafe conversation would likely contain Sydney and NSW candidates, however #Labor would contain a range of location candidates), and would therefore provide useful context for geolocation of the post under consideration. A measure of location diversity across the conversation (e.g. ratio of count of unique location references to total count of posts) could be used with a simple threshold.

Note that when processing the conversation to identify location candidates, prioritisation of sources could be implemented, for example to rely on higher precision and lower recall methods of generating location candidates (e.g. user TwitterPlaces or user profile locations ahead of body text processing).

The resolution of candidates (Geo Resolver 40) step 140 obtains the set of potential location resolutions for each extracted location candidate (eg city candidates 35, and PoI, street and relative location candidates 36). These may resolve to at least a country. Preferably the resolution is to a State/province—comprising a state/province/county and country; or even more preferably a city—comprising at least a city, state/province/county, and country (or even a lower level). Prior to resolution, duplicate candidates are discarded (the multiple candidate extraction filters may identify the same candidate within a post).

In one embodiment the Nominatim geocoder is used. Nominatim is a geocoder backed by the OpenStreetMap geographic database (https://nominatim.openstreetmap.org/). However any Geocoder service could be used. Nominatim supports both parametrised and free-text search queries. Parametrised queries specify street, city, state and/or country values to search on, and provide better efficiency and accuracy compared to free-text queries. In one embodiment parametrised country, state, city and/or street queries are used to resolve candidates from the Bloom Filter and street address candidates from the Regex Filter respectively, and all other candidates are resolved using free-text queries.

Nominatim assigns an importance score to each resolution, based factors including:

The type (or level) of the location (e.g. city, street, building)
The PageRank of the Wikipedia article about the location (if applicable)
The string similarity between the query string and the name of the location For each candidate, we obtain a list of potential resolutions. In many embodiments city-level granularity is sufficient and thus only attempt to obtain at most 1 resolution per city. Resolutions are obtained as follows, for each candidate:

1. Query Nominatim, retrieving the top n resolutions for the candidate (n=10 by default)
2. Clean the resolutions:
   Normalised representation of Australian states
   Clean city fields containing erroneous data (e.g. containing postcode rather than city name)
3. Discard resolutions which do not refer to a point of interest, city/town/village/hamlet, state/province/county, or country;
4. For resolutions below State/province level, group resolutions by city;
5. Within each city group, discard all but the resolution with the highest importance score;
   For resolutions within Australia, break ties by selecting the resolution with the smallest postcode (i.e. closest to GPO);
   For other resolutions, or if tie-breaking fails, return multiple resolutions;

6. Discard resolutions below a configured importance threshold (optional)

The candidate resolution pipeline can be configured to achieve the desired performance characteristics. For example the number of resolutions retrieved from Nominatim for each candidate can be configured (10 are retrieved by default). In the one embodiment candidates are resolved to city-level granularity. However in other embodiments the target granularity for resolutions can be set at other levels such as street-level, city-level, etc. In some embodiments an importance threshold can be configured, such that resolutions below the threshold are discarded. This allows low quality resolutions to be eliminated prior to disambiguation.

The resolution disambiguation step 160 (Disambiguation resolution block 60) performs disambiguation of the potential location resolutions 42 for each candidate location, which we will also refer to as a term. The goal of disambiguation is to identify the correct (ie most likely) resolution from the set of possible resolutions returned by Nominatim (or other GeoResolver) 40 for each location candidate (term t).

Where there are two or more candidate locations (each with multiple possible resolutions), one approach to resolution disambiguation is to calculate the physical distance between each pair of possible candidate locations and apply a distance scoring function to each possible combination. Nominatim (and other geocoders) can return the latitude and longitude coordinates of a location, and then the distance between two candidate locations a and b can be calculated using Equation 1 for the great circle distance on a sphere:

$$d(a,b) = 6371 \arccos(\sin(a_y)\sin(b_y) + \cos(a_x)\cos(b_x)\cos(a_x - b_x))$$  Equation 1 where 6371 km is the radius of the earth (the sphere), $(a_x, a_y)$ are the latitude and longitude of location a, and $(b_x, b_y)$ are the latitude and longitude of location b.

A scoring function is then applied to these results to measure how good a candidate resolution is as the choice for disambiguation. In this embodiment the scoring function will be defined such that the highest score corresponds to the best candidate resolution, but in other embodiments the scoring function could be defined such as the lowest score corresponds to the best candidate resolution, or even that the best candidate resolution is the score closest to a target value (for 1). For example we calculate, for each candidate resolution r, and every candidate location term t (except for the term for which r is a resolution and any terms having only a single resolution), the shortest distance $c(r,t)$ between resolution r and any of the resolutions for term t. Then we calculate, for every resolution r of every term t, the scoring function $S_r^t$. One simple scoring function is the Total Distance scoring function given by:

$$S_r^t = -\sum_{t_2 \in T, t_2 \neq t} c(r, t_2)$$  Equation 2

In Equation (2), distance function $c(r, t_2)$ can be calculated using any suitable distance function, such as the great circle distance function (equation 1; ie $c(r, t_2) = d(r, t_2)$). The resolution with the highest overall score (ie closest to 0)—corresponding to the shortest total distance is selected as the first disambiguation result. All other resolutions for that candidate location term are then removed from the table and the process repeated. That is the scoring function is recalculated for the reduced set of combinations (or table) and the next largest score selected as the next disambiguation result. This is repeated until there is only one resolution left for each candidate location term. More complicated scoring functions can be used, including the use of weighting functions, for example where a N-gram term is broken into subgram (eg Martin Place being broken into sub grams "Martin" and "Place"). The purpose of the weighting function is to handle overlapping ("conflicting") candidates. For example, the text segment "Adelaide Oval" might generate two candidates: "Adelaide" and "Adelaide Oval". As these candidate overlap, only one can be the correct/true candidate. The weighting function ensures that the total influence for a group of conflicting candidates is no more than that of a single candidate without conflicts. In some embodiments a weight $W_{t_2}^{t_1}$ can be considered the probability that term $t_2$ is a true location in the text given that $t_1$ is a true location reference, and are defined such that:

$$W_{t_2}^{t_1} = 0 \forall t_1, t_2 \in T, t_1 \neq t_2 | t_1 \text{ and } t_2 \text{ conflict}$$  Equation 3 where T is the set of N candidate terms (ie $T = \{t_1, t_2, \ldots, t_N\}$). If no terms in T in conflict then all weights are equal to 1. Weights are typically subject to probability like constraints such as:

$$W_t^t = 1 \forall t \in T$$  Equation 4

In some embodiments the disambiguation step also involves discarding any other candidates that overlap/conflict with the best candidate for a particular group of conflicting candidates.

However this requires at least two candidate locations whereas many short texts only contain a reference to a single candidate location (ie the set of terms $T = \{t_1\}$). Thus to both allow use in this case, and also to improve performance in cases with multiple locations (ie N terms: $T = \{t_1, t_2, \ldots, t_N\}$), the method further comprises the step of determining one or more anchor locations ($t_\alpha$) from metadata 150 such as the post author's profile 14. This additional anchor (or virtual) location then allows the above distance based resolution to be performed (in cases where it would otherwise not be possible). For example consider the following example post with a single location candidate highlighted in bold:

"Martin Place is the spot for our February 18 rally!"

A Nominatim query for "Martin Place" returns many potential resolutions, including:

Martin Place, Sydney, NSW, Australia
Martin Place, Brisbane, QLD, Australia
Martin Place, NM, USA
Martin Place, Apopka, Fla., USA
Martin Place, Akron, Ohio, USA
Martin Place, Dalkeith, Scotland, UK Even if we limit our search to Australia, there are more than 40 separate streets named Martin Place. Clearly the above post text does not provide sufficient context to identify which of these resolutions corresponds to the correct Martin Place. We overcome this challenge using one or more additional anchor locations, which we extract from post metadata. Anchor resolutions 52 may be identified in, and extracted, from the following sources:

Tagged location mentions. For example, tweets can tag a location associated with the tweet content, which stores add metadata including geographic coordinates to the tweet.

Geotagging. Many social networks tag posts with geographic coordinates of the author at the time of posting. Many users opt-out of such geotagging.

Author profile location.

Author time zone. We map time zones to the geographic coordinates of their most populous city using the zonetab database.

In the case of "share" or "reply" posts, we also consider the above sources from the original post.

Network based features: friends, followers, @mention. A label propagation algorithm allows one to derive an author's likely location from these features.

Conversation based features—many social networks allow topic-based "conversations" e.g. hashtags in twitter. The set of locations mentioned within the conversation can be used to label another tweet from that conversation. E.g. a tweet "Legal stoush erupts before coroner hands down #LindtCafe siege findings"—has no explicit geo-candidates within it, but a location could be inferred from analysis of the set of tweets with the #LindtCafe hashtag.

Posting history, with a time decay i.e. look through person's history for location mentions. The further back they are the more decay is added. This decay may optionally be implemented as a weight function in the scoring algorithm.

Language of the post/author. Many languages are geographically focused and specific to one or few countries. We map these languages to a representative geographic coordinate (e.g. capital city).

Once one or more anchor resolution locations 52 are determined 150, location resolution disambiguation 160 is performed. The typical input to this algorithm is the set of candidate terms and their potential resolutions as extracted in the previous sections. We also provide one or more additional anchor locations ($t_a$) as input. Each anchor is treated as an additional "candidate" with a single resolution—that is the anchor $t_a$ is added to the set of terms ($T \leftarrow \{\{T\}, t_a\}$). The goal is to identify the single best resolution for each candidate.

The example in Table 2 illustrates the use of anchors to achieve resolution disambiguation. In this embodiment, the resolution disambiguation algorithm comprises computing the Haversine distance (although in other embodiments any geographic distance measure can be used here) between each resolution and all potential resolutions for other candidates (potential resolutions for the same candidate are not scored against each other). Each resolution is then assigned a score based on its distance to the closest resolution for each other candidate. The best resolution (from all non-anchor candidates, excluding candidates having only a single resolution) with the highest score is then selected, other resolutions for the corresponding candidate eliminated, and the process repeated until a single resolution remains for every candidate. Anchor resolutions contribute to the scoring for other resolutions, but are not assigned a score themselves.

multiple locations or multiple anchors the calculations are more complex as outlined above. Weighting functions can be also be used. In other embodiments, other algorithms could be implemented to achieve the same goal: minimisation of the weighted distance between all extracted candidates. For example Table 3 defines an algorithm based upon the 1 phase disambiguation algorithm described in Section 2.5 of Brunsting, S., De Sterck, H., Dolman, R. and van Sprundel, T. (2016). GeoTextTagger: High-Precision Location Tagging of Textual Documents using a Natural Language Processing Approach. arXiv preprint arXiv: 1601.05893, the entire content of which is incorporated by reference. This algorithm is a greedy algorithm to select the term t* and result r* that have the highest score ($S_{r*}{}^{t*}$) using any suitable scoring function. Suitable scoring functions include those based on total distance, inverse distance, inverse term frequency, weighted versions of the preceding, and weighted normalised versions. The weighting functions generate probability like weights as per equations (3) and (4). Additionally we note that conflicting terms appear in groups. We can define G(t) to be the group of term t, and G(t) is the smallest set of all terms that overlap with t or any of the terms in G(t). Groups are disjoint and each group corresponds to a segment or sequence of words in the text (and segments are disjoint). Groups with more than one term have multiple interpretations. An interpretation of a group is a maximal subset of the group which contains terms that do not conflict. An interpretation does not have to cover all words in the segment of text, but it must contain enough terms such that no non-conflicting terms can be added to the group. When computing distance based scores we will, for every group $G \neq G(t_1)$, define weights $W_{t_2}{}^{t_1}$ with respect to $t_1$ for all the terms $t_2$ in group G. For every group G these weights sum up to 1. If G has only one element $t_2$ (which does not conflict with $t_1$ since $G \neq G(t_1)$), then $W_{t_2}{}^{t_1}=1$. If G has more than one element, the weights $W_{t_2}{}^{t_1}$ are defined as follows. Let q be the number of interpretations of group G, each with weight $1/q$, and let $n_i$ be the number of terms in interpretation i, each with weight $1/n_i$ in interpretation i. Then:

$$W_{t_2}^{t_1} = \sum_{\substack{\text{interpretations } i \\ \text{that contain } t_2}} \frac{1}{q} \frac{1}{n_i} \qquad \text{Equation 5}$$

The algorithm in Table 3 is a greedy algorithm that uses a single while loop (one phase) to disambiguate the terms. However other algorithms could be implemented to achieve

TABLE 2

Resolution disambiguation example for post with a single candidate (3 resolutions), plus an additional anchor location

|  |  | Martin Place | | | Anchor-Profile Location |
| --- | --- | --- | --- | --- | --- |
|  |  | (1) | (2) | (3) | (1) |
| Martin Place | (1) Sydney, NSW, AU |  |  |  | 0.23 km |
|  | (2) Brisbane, QLD, AU |  |  |  | 734 km |
|  | (3) Martin Place, NM, USA |  |  |  | 13080 km |
| Anchor Profile Locations | (1) Sydney, NSW, AU | 0.23 km | 734 km | 13080 km |  |
| Score |  |  | 4.35 | 0.00136 | 0.0000765 |

The example in Table 2 illustrates the use of anchors to achieve resolution disambiguation. In cases where there are the same goal: minimisation of the weighted distance between all extracted candidates. For example a two phase approach could be used in which a first while loop resolves all conflicting terms and a second loop disambiguates between location search results. Other variations are also possible.

TABLE 3

Resolution disambiguation algorithm

| # | Step | Comment |
|---|------|---------|
| 0 | T← {{T{, $t_a$} | Obtain anchor term $t_a$ and add to set of terms T |
| 1 | Calculate Weights $W_{t_2}{}^{t_1} \forall t_1, t_2 \in T$ | Weights are subject to equations (3), (4) and (5). |
| 2 | while ($\exists p \in P\|(\|R^p\| > 1)$ or ($\exists t_1, t_2 \in T\|(W_{t_2}{}^{t_1} \neq 1)$) do | Loop repeats whilst there are terms to be disambiguated. eg phrases with multiple results or conflicting (overlapping) terms |
| 3 |   for all t ∈ T do | |
| 4 |     for all r ∈ $R^t$ do | |
| 5 |       Calculate $S_r{}^t$ | |
| 6 |     end for | |
| 7 |   end for | |
| 8 |   t*,r* ← (t ∈ T,r ∈ $R^t$) that maximise $S_r{}^t$ and satisfy ($\|R^t\| > 1$) or $\exists t' \in T\|(W_t{}^{t'} \neq 1)$ | Greedy algorithm selects term t* and result r* that have the highest score ($S_{r*}{}^{t*}$). |
| 9 |   $R^{*p} \leftarrow \{r^*\}$ | Set best score r* as the only result that is considered for phrase $t^*_p$ |
| 10 |   for all t ∈ T do | Remove any terms that conflict with r*, settling on the interpretation that contains term t* |
| 11 |     if $W_t{}^{t*} = 0$ then | |
| 12 |       T ← ($T_t$) | |
| 13 |     end if | |
| 14 |   end for | Term t* is now completely disambiguated |
| 15 |   Update P to reflect changes in T | |
| 16 |   Recalculate $W_{t_2}{}^{t_1} \forall t_1, t_2 \in T$ | As in step 1 |
| 17 | end while | |

The resolution disambiguation pipeline can be configured to achieve desired performance characteristics. Configurable attributes include:

Anchor location sources, which vary between social networks

Order of precedence for anchor location sources

Number of anchor locations to use in disambiguation (default is 1)

Scoring function used by the disambiguation algorithm. These include Total Distance, Weighted Distance, Inverse, Weighted Inverse, Weighted Normal Inverse, Inverse Frequency, Weighted Inverse Frequency, Weighted Normalised Inverse Frequency etc In other embodiments the scoring function can be also be extended to include:

A configurable weighting applied to anchor locations during scoring. This adjusts the influence of anchors locations relative to that of normal resolutions.

An option to weight the score contribution of each resolution according to the generating candidate extraction filter, such that more reliable candidate extraction methods have greater influence during disambiguation.

An option to weight the score contribution of each resolution by its Nominatim importance score, or a resolution confidence score returned by an alternative geo resolver In one embodiment the configurable weighting applied to anchor locations during scoring involves weighting/multiplying the contribution to the scoring function (e.g. Equation 2) to control the influence of the anchor. A weight of 1.0 gives the anchor the same level of influence as resolutions for any other candidate in the document. Whereas a weight less-than/greater-than 1.0 reduces/increases the influence of the anchor (in documents having more than one location candidate). In one embodiment the option to weight the score contribution of each resolution according to the generating candidate extraction filter, involves weighting the score contribution of candidates from Bloom filters to increase their influence, while weighting to decrease the influence of candidates from the PoI/street filters. The idea is that city/state/country names (identified by a Bloom filter) are much more likely to be resolved correctly than PoI/street names, which are often more ambiguous (e.g. Parliament House, Victoria Square, Martin Place). Other scoring functions can also be used in other embodiments.

To demonstrate the effectiveness of our geo-tagging approach for short text, we evaluate it using a labelled evaluation dataset. This evaluation dataset consists of 925 tweets, published on Twitter during the month of November 2016. The body text of each tweet was labelled with zero or more expected location candidates and their corresponding city/state/country resolution. This labelling was performed manually by a human analyst.

For example, the following tweet:

"Union Square Park in #NewYork City in spring bloom: https://t.co/b13PsbKTez #travel #discover https://t.co/pYVVVGvYB8"

Has two location candidates, namely "Union Square Park" and "New York". Both of these have the same resolution:

City: New York City
State: New York
Country: United States of America

Our geo-tagging pipeline was evaluated using the labelled dataset. We evaluate the performance of the pipeline on Australian and Indonesian locations only, as our current application is concerned primarily with geo-tagging of such locations. Table 4 defines evaluation metrics as applied to our geo-tagging pipeline.

TABLE 4

Evaluation Metric Definitions

| Definition | Formula | Description |
|------------|---------|-------------|
| True Positive | | A generated resolution, that matched one of the expected (human-labelled) resolutions for the document. tp denotes the total number of true positives generated for the dataset. |
| False Positive | | A generated resolution, that did not match one of the expected resolutions for the document. fp denotes the total number of false positives generated for the dataset. |
| False Negative | | An expected resolution, for which the pipeline did not generate a matching resolution. fn denotes the total number of false negatives for the dataset. |
| True Negative | | A document with no expected resolutions, for which the pipeline does not generate any resolutions. tn denotes the total number of true negatives for the dataset. |

TABLE 4-continued

Evaluation Metric Definitions

| Definition | Formula | Description |
|---|---|---|
| Precision | $\dfrac{tp}{tp + fp}$ | The proportion of generated resolutions that were correct (i.e. matched an expected resolution). |
| Recall | $\dfrac{tp}{tp + fn}$ | The proportion of expected resolutions that were correctly identified by the pipeline. |
| F1 Score | $2 \cdot \dfrac{\text{precision} \cdot \text{recall}}{\text{precision} + \text{recall}}$ | The harmonic mean of precision and recall, often used as a balanced measure of accuracy. |
| False Positive Rate (FPR) | $\dfrac{fp}{fp + tn}$ | The rate at which false positive resolutions are generated for documents for which we do not expect a resolution to be generated (i.e. fp + tn). |

Table 5 compares the performance of the geo-tagging pipeline configured to use various combinations of the candidate extraction methods described previously. Our default configuration strikes a balance between high recall and low false-positive rate. By default, only the following candidate source->filter combinations are enabled:

All->Override
Body text->Bloom
Hashtags->Bloom

Under this default configuration, the pipeline achieves the following performance:

Precision: 0.76
Recall: 0.55
F1 Score: 0.63
False Positive Rate: 0.10

TABLE 5

Geo pipeline performance metrics for various candidate extraction methods. All metrics were computed with resolution disambiguation and anchor resolutions enabled. Components enabled in default configuration are shaded in grey. All Candidate Filters excludes override filter for Body Text, Hashtags and User Mention Candidate Sources.

| Candidate Source(s) | Candidate Filter(s) | Precision | Recall | F1 Score | False Positive Rate |
|---|---|---|---|---|---|
| Default | Default | 0.76 | 0.55 | 0.63 | 0.10 |
| False Positive | All | 0.70 | 0.56 | 0.62 | 0.15 |
| All | Override | 0.81 | 0.40 | 0.53 | 0.05 |
| Body Text | All | 0.31 | 0.17 | 0.22 | 0.20 |
|  | Bloom | 0.31 | 0.12 | 0.18 | 0.15 |
|  | Regex (PoI) | 0.56 | 0.07 | 0.13 | 0.03 |
|  | NER | 0.35 | 0.11 | 0.17 | 0.11 |
| Hashtags | All | 0.68 | 0.10 | 0.18 | 0.03 |
|  | Bloom | 0.71 | 0.10 | 0.17 | 0.02 |
|  | Regex (PoI) | 0.86 | 0.06 | 0.10 | 0.01 |
| User Mentions | All | 0.31 | 0.03 | 0.05 | 0.03 |
|  | Bloom | 0.36 | 0.02 | 0.04 | 0.02 |
|  | Regex (PoI) | 0.25 | 0.01 | 0.02 | 0.02 |

Table 6 provides metrics for the geo-tagging pipeline both with and without the resolution disambiguation. We compute these metrics with the overrides filter disabled, as resolutions generated by this filter bypass the resolution disambiguation phase. On our dataset, resolution disambiguation yields a significant improvement in the false-positive rate, at the expense of a small reduction in recall. Adding anchor resolutions to the disambiguation process has a negligible impact on overall performance.

TABLE 6

| Resolution disambiguation performance impact, with overrides filter disabled, and all other candidate extraction filters enabled. | | | | |
|---|---|---|---|---|
| Resolution Disambiguation | Precision | Recall | F1 Score | False Positive Rate |
| No disambiguation | 0.36 | 0.30 | 0.33 | 0.28 |
| Disambiguation, no anchor resolutions | 0.40 | 0.28 | 0.33 | 0.22 |
| Disambiguation, with anchor resolutions | 0.39 | 0.27 | 0.32 | 0.23 |

Resolution anchors were introduced to improve performance in a specific case, posts containing only a single ambiguous location candidate, which has multiple plausible resolutions. This dataset does not demonstrate the utility of anchors, as many tweets in our dataset either contain multiple candidates that already provide sufficient context for disambiguation, or contain a single candidate for which the most likely resolution is the correct one.

However Tables 7, 8 and 9 provide example tweets for which disambiguation is impossible without anchor resolutions. In each example, our geo-tagging pipeline yields the correct resolution when anchors are used, but an incorrect resolution without anchors. The anchor resolutions were derived from the author profile location or time zone in these examples.

TABLE 7

| Anchor resolution example, tweet 1 | |
|---|---|
| Tweet (location candidate in bold) | Lovely day here in Hyde Park |
| Author Profile Location | Sydney, NSW, Australia |
| Author Time Zone | Australia/Sydney |
| Incorrect Resolution (no anchors) | London, UK |
| Correct Resolution (anchors) | Sydney, NSW, Australia |

TABLE 8

| Anchor resolution example, tweet 2 | |
|---|---|
| Tweet (location candidate in bold) | Caught the tram to Victoria Square |
| Author Profile Location | |
| Author Time Zone | Australia/Adelaide |
| Incorrect Resolution (no anchors) | Montreal, Quebec, Canada |
| Correct Resolution (anchors) | Adelaide, SA, Australia |

TABLE 9

| Anchor resolution example, tweet 3 | |
|---|---|
| Tweet (location candidate in bold) | Parliament House always looks its best in #Labor red |
| Author Profile Location | Adelaide, SA, Australia |
| Author Time Zone | Australia/Adelaide |
| Incorrect Resolution (no anchors) | Melbourne, VIC, Australia |
| Correct Resolution (anchors) | Adelaide, SA, Australia |

An embodiment of computer system 300 for implementing the methods described herein is illustrated in FIG. 3. Text documents 302 are posted and collated in a text storage device 304. A computing apparatus 310 comprises a central processing unit (CPU) 320, a memory 330, and an Input/Output (or Communications) interface 340, and may include a graphical processing unit (GPU) 350, and input and output devices 360. The CPU 310 may comprise an Arithmetic and Logic Unit (ALU) 322 and a Control Unit and Program Counter element 324. The memory 330 may comprise solid state memory 332 and secondary storage 334 such as a hard disk. The Input/Output Interface 340 may comprise a network interface and/or communications module for communicating with an equivalent communications module in another apparatus using a predefined communications protocol (e.g. Bluetooth, Zigbee, IEEE 802.15, IEEE 802.11, TCP/IP, UDP, etc). Input and output devices may be connected via wired or wireless connections. The Input/Output interface 340 may be in communication with the text storage device 304 and other computing apparatus or servers 306 such as a Nominatim server which provides an address lookup. Input and output devices 360 may comprise a keyboard, a mouse, and a display apparatus such as a flat screen display (eg LCD, LED, plasma, touch screen, etc), a projector, CRT, etc.

The computing apparatus 310 may comprise a single CPU (core) or multiple CPU's (multiple core), or multiple processors. The computing apparatus may be a server, desktop or portable computer and may use a parallel processor, a vector processor, or be may be part of a distributed (cloud) computing apparatus. The memory 330 is operatively coupled to the processor(s) 320 and may comprise RAM and ROM components 332, and secondary storage components such as solid state disks and hard disks 334, which may be provided within or external to the device. The text storage device 304 may be an internal device, a directly connected external device, or a network storage device (ie connected over a network interface) external to the computing apparatus 310. The memory may comprise instructions to cause the processor to execute a method described herein. The memory 330 may be used to store the operating system and additional software modules or instructions. The processor(s) 320 may be configured to load and execute the software modules or instructions stored in the memory 330. A report comprising the likely geographic locations determined from the texts (step 170) may be compiled into an electronic report and displayed on a display apparatus 360, or the likely geographic locations may be reported to another computing apparatus 306 for report compilation or other uses.

Embodiments of the system can be integrated into other analysis solutions such as ongoing high-volume or "population-level" ongoing monitoring of social media. The methods described herein allow analysis to focus on particular geographic regions, groups or topics of interest, and underpins these analysis solutions. At a high-level, embodiments of the method of enable users to focus their analysis on social media documents that either: mention specific regions or places of interest; and/or originate from specific regions or places of interest.

The present application describes a method for estimating a geographic location from one or more short texts. Embodiments of the method comprise a number of features which provide new functionality and increase performance over existing systems.

In a high-volume distributed data processing system, comparing every single word against every single potentially matching location name imposes a very large performance penalty. A Bloom filter allows the list of potential matches to be compressed into a very small representation which can be quickly checked for matches. The method also utilises anchor locations extracted from metadata to improve the location resolution disambiguation step, and allow use in cases where only a single candidate location is extracted from the short text. This significantly increases the number of tweets for which geotagging can be applied to. Further a range of scoring functions and weighting functions can be used to improve the accuracy of the resolution disambiguation.

As used herein, a phrase referring to "at least one off" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

We claim:

1. A computer implemented method for estimating a geographic location from one or more documents posted online, the computer implemented method comprising:
   obtaining one or more documents posted online, and metadata relating to each posted document;
   determining a set of one or more location candidates from parsing text in each document and metadata, wherein each location candidate is a geographic location referred to, or included in the text;
   determining one or more location resolutions for each location candidate, wherein each location resolution comprises geographic location metadata comprising at least a country;
   determining one or more anchor locations from analysing the metadata wherein each anchor location has a single location resolution;
   performing resolution disambiguation on the one or more location resolutions for each location candidate wherein the one or more anchor locations are added to the set of location candidates to be used as additional location candidates, and resolution disambiguation is performed using a distance based scoring function such that a most likely geographic location for a location candidate having two or more location resolutions is the location resolution with a score corresponding to a shortest total distance between the location resolution and each location resolution for each other candidate location including the one or more anchor locations such that anchor resolutions contribute to the scoring for other location resolutions but are not assigned a score themselves; and
   reporting the most likely geographic location for each location candidate.

2. The computer implemented method as claimed in claim 1, wherein the metadata relating to a posted document comprises an author who posted the document and the one or more anchor locations are selected from one or more of:
   tagged location mentions;
   a geotag comprising geographic coordinates of the author ata [[the]] time of posting;
   a user profile location; or
   a geographic location of a most populous city in a same time zone as an author time zone.

3. The computer implemented method as claimed in claim 2, wherein the posted document is a share or reply post to an original post and the one or more anchor locations are selected from one or more of the following from the original post:
   a tagged location mention;
   the geotag comprising geographic coordinates of the author at the time of posting;
   the user profile location; or
   the geographic location of the most populous city in the same time zone as the author time zone.

4. The computer implemented method as claimed in claim 1, wherein the metadata relating to a posted document comprises an author who posted the document and the one or more anchor locations are selected using a label propagation algorithm applied to friends, followers, and @mentions associated with the author.

5. The computer implemented method as claimed in claim 1, wherein the one or more anchor locations are selected using conversation based features comprising a set of texts sharing a common reference.

6. The computer implemented method as claimed in claim 1, wherein the metadata relating to a posted document comprises an author who posted the document and the one or more anchor locations are selected using a posting history of the author.

7. The computer implemented method as claimed in claim 6, wherein the metadata relating to a posted document comprises an author who posted the document and the one or more anchor locations are selected by analysing the posting history of the author within a predetermined time period.

8. The computer implemented method as claimed in claim 1, wherein the metadata relating to a posted document comprises an author who posted the document and determining one or more anchor location comprises determining a language of the author who posted the document and selecting one or more geographic locations of a capital city in a country associated with the determined language.

9. The computer implemented method as claimed in claim 1, wherein the text in a document is passed through one or more Bloom filters each constructed from a database of location level names to identify one or more location candidates.

10. The computer implemented method as claimed in claim 1, wherein determining the one or more location candidates comprises passing the text from a document through a word segmenter and a natural language processing based named entity recognition filter to produce a plurality of N-gram location candidates, and the N-gram location candidates are each passed to one or more Bloom filters each constructed from a database of location level names, and a Regular Expression Filter configured to identify points of interest (POIs), street addresses and relative location mentions.

11. The computer implemented method as claimed in claim 10, further comprising using a location override filter configured to provide specific user-configured location resolutions for a further set of candidates, and one or more location candidates from the Bloom filters and the Regular Expression Filter are filtered to exclude location candidates identified by the location override filter.

12. The computer implemented method as claimed in claim 1, wherein resolution disambiguation is performed iteratively to determine a single resolution for each candidate resolution comprising computing a geographic distance measure between each location resolution and each location resolution for each other candidate location including the one or more anchor locations and assigning a score, by way of a scoring function, for each location resolution of a candidate location based on a distance to a closest resolution for each other candidate location including the one or more anchor locations, and then selecting the location resolution with a highest score from all non-anchor candidate locations and excluding candidate locations having only a single resolution, and then eliminating all other location resolutions for the corresponding candidate location, and repeating until a single location resolution remains for every location candidate.

13. The computer implemented method as claimed in claim 12 wherein the scoring function uses a weighting function.

14. The computer implemented method as claimed in claim 13, wherein the metadata relating to a posted document comprises an author who posted the document and an anchor location is estimated from analyzing a posting history of the author, and a time decay is applied to the posting history, and performing disambiguation resolution uses the time decay as a weight function.

15. The computer implemented method as claimed in claim 13, wherein the weighting function is configured to adjust an influence of anchor location relative to non-anchor location resolutions.

16. The computer implemented method as claimed in claim 13, determining one or more location candidates comprises passing the text from a document through a word segmenter and a natural language processing based named entity recognition filter to produce a plurality of N-gram location candidates, and the N-gram location candidates are each passed to one or more Bloom filters each constructed from a database of location level names, and a Regular Expression Filter configured to identify points of interest (POIs), street addresses and relative location mentions, and wherein the weighting function is configured to weight a score contribution of a location candidate obtained from the Bloom filter to increase their influence and to decrease the influence of a location candidate from the Regular Expression Filter.

17. The computer implemented method as claimed in claim 1, wherein resolution disambiguation is performed by minimising a weighted distance between all extracted candidate locations.

18. The computer implemented method as claimed in claim 17, wherein a greedy algorithm is used to select an anchor term t* and a location result r* that have the highest score ($s_{r^*}^{t^*}$) using a scoring function, wherein the scoring function is selected from the group consisting of scoring functions based on a total distance, an inverse distance, or an inverse term frequency, or based on weighted versions of the total distance, the inverse distance, or the inverse term frequency, or based on a weighted normalised version of the total distance, the inverse distance, or the inverse term frequency.

19. The computer implemented method as claimed in claim 18, wherein the greedy algorithm is configured to use a single loop to disambiguate the anchor terms.

20. The computer implemented method as claimed in claim 1, wherein determining one or more anchor locations from analysing the metadata comprises analysing metadata in a predefined order of precedence for anchor location sources.

21. A computer program product, comprising computer readable instructions stored on a non-transitory computer readable medium for causing a processor to perform operations comprising:
obtaining one or more documents posted online, and metadata relating to each posted document;
determining a set of one or more location candidates from parsing text in each document and metadata, wherein each location candidate is a geographic location referred to, or included in the text;
determining one or more location resolutions for each location candidate, wherein each location resolution comprises geographic location metadata comprising at least a country;
determining one or more anchor locations from analysing the metadata wherein each anchor location has a single location resolution;
performing resolution disambiguation on the one or more location resolutions for each location candidate wherein the one or more anchor locations are added to the set of location candidates to be used as additional location candidates, and resolution disambiguation is performed using a distance based scoring function such that a most likely geographic location for a location candidate having two or more location resolutions is the location resolution with a score corresponding to a shortest total distance between the location resolution and each location resolution for each other candidate location including the one or more anchor locations such that anchor resolutions contribute to the scoring for other location resolutions but are not assigned a score themselves; and
reporting the most likely geographic location for each location candidate.

22. A computing system comprising at least one processor operatively coupled to at least one memory, wherein the processor is configured to perform operations comprising:
obtaining one or more documents posted online, and metadata relating to each posted document;
determining a set of one or more location candidates from parsing text in each document and metadata, wherein each location candidate is a geographic location referred to, or included in the text;
determining one or more location resolutions for each location candidate, wherein each location resolution comprises geographic location metadata comprising at least a country;
determining one or more anchor locations from analysing the metadata wherein each anchor location has a single location resolution;
performing resolution disambiguation on the one or more location resolutions for each location candidate wherein the one or more anchor locations are added to the set of location candidates to be used as additional location candidates, and resolution disambiguation is performed using a distance based scoring function such that a most likely geographic location for a location candidate having two or more location resolutions is the location resolution with a score corresponding to a shortest total distance between the location resolution and each location resolution for each other candidate location including the one or more anchor locations such that anchor resolutions contribute to the scoring for other location resolutions but are not assigned a score themselves; and
reporting the most likely geographic location for each location candidate.

* * * * *